United States Patent [19]

Jacobi et al.

[11] 4,191,207
[45] Mar. 4, 1980

[54] IRRIGATION PIPE CONTROL SYSTEM

[75] Inventors: Edgar F. Jacobi, Huntington Beach, Calif.; Mark R. Madden, Plainsfield, Wis.

[73] Assignee: Colkhi, Inc., San Diego, Calif.

[21] Appl. No.: 889,233

[22] Filed: Mar. 23, 1978

[51] Int. Cl.² ............................................. B05B 3/00
[52] U.S. Cl. ................................. 137/344; 239/177; 356/400
[58] Field of Search ............... 137/344; 239/177, 212; 356/172, 72

[56] References Cited

U.S. PATENT DOCUMENTS

| | | | |
|---|---|---|---|
| 3,632,215 | 1/1972 | Holtz | 356/172 |
| 3,637,309 | 1/1972 | Hosterman | 356/172 |
| 3,712,544 | 1/1973 | Ririe et al. | 239/177 |
| 3,833,302 | 9/1974 | Hock | 356/172 |
| 3,972,623 | 8/1976 | Funayama | 356/172 |
| 4,029,415 | 6/1977 | Johnson | 356/172 |
| 4,033,508 | 7/1977 | Jacobi et al. | 239/177 |
| 4,034,778 | 7/1977 | Sage et al. | 239/177 |
| 4,099,669 | 7/1978 | Cortopassi | 239/177 |

*Primary Examiner*—Martin P. Schwadron
*Assistant Examiner*—A. Michael Chambers
*Attorney, Agent, or Firm*—I. Michael Bak-Boychuk

[57] ABSTRACT

A laser referenced control system for maintaining sequence and correcting the deflections of a moving irrigation pipe includes a laser positioned on a reference coordinate against which the irrigation program sequence and the motion of the pipe are taken. In typical use the pipe is supported on powered wheeled carriages which move across the irrigated terrain at a predetermined rate and it is these wheeled carriages that are controlled according to the deviation of the end of the pipe relative the laser optical axis. This deviation is measured in a fore and aft plane by a phototransducer array to provide the control inputs to the carriages, the vertical terrain undulations being compensated by way of a laser alignment servosystem. In this manner the vertical changes in pipe alignment are taken out, the only correction being made in the plane of translation.

3 Claims, 5 Drawing Figures

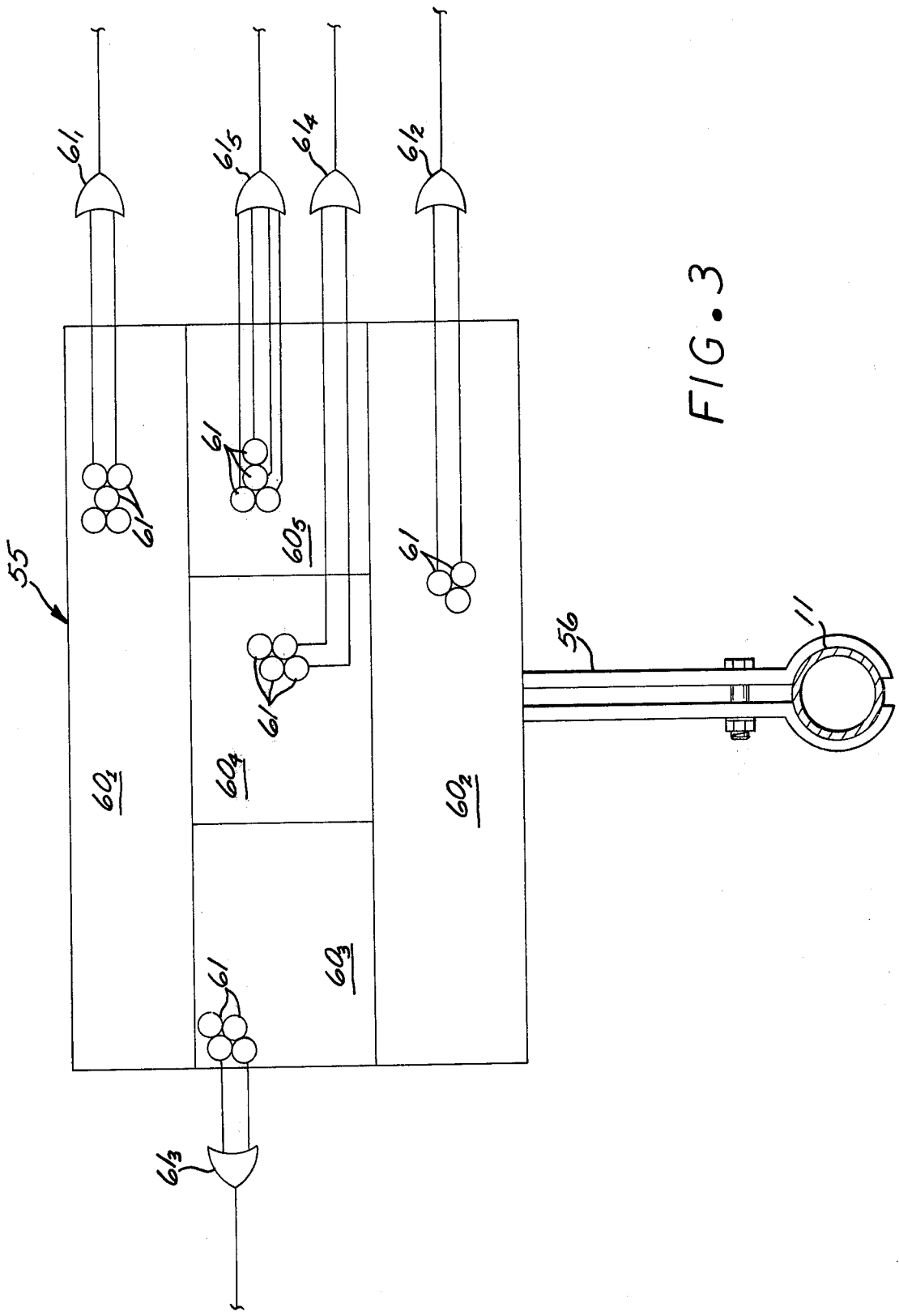

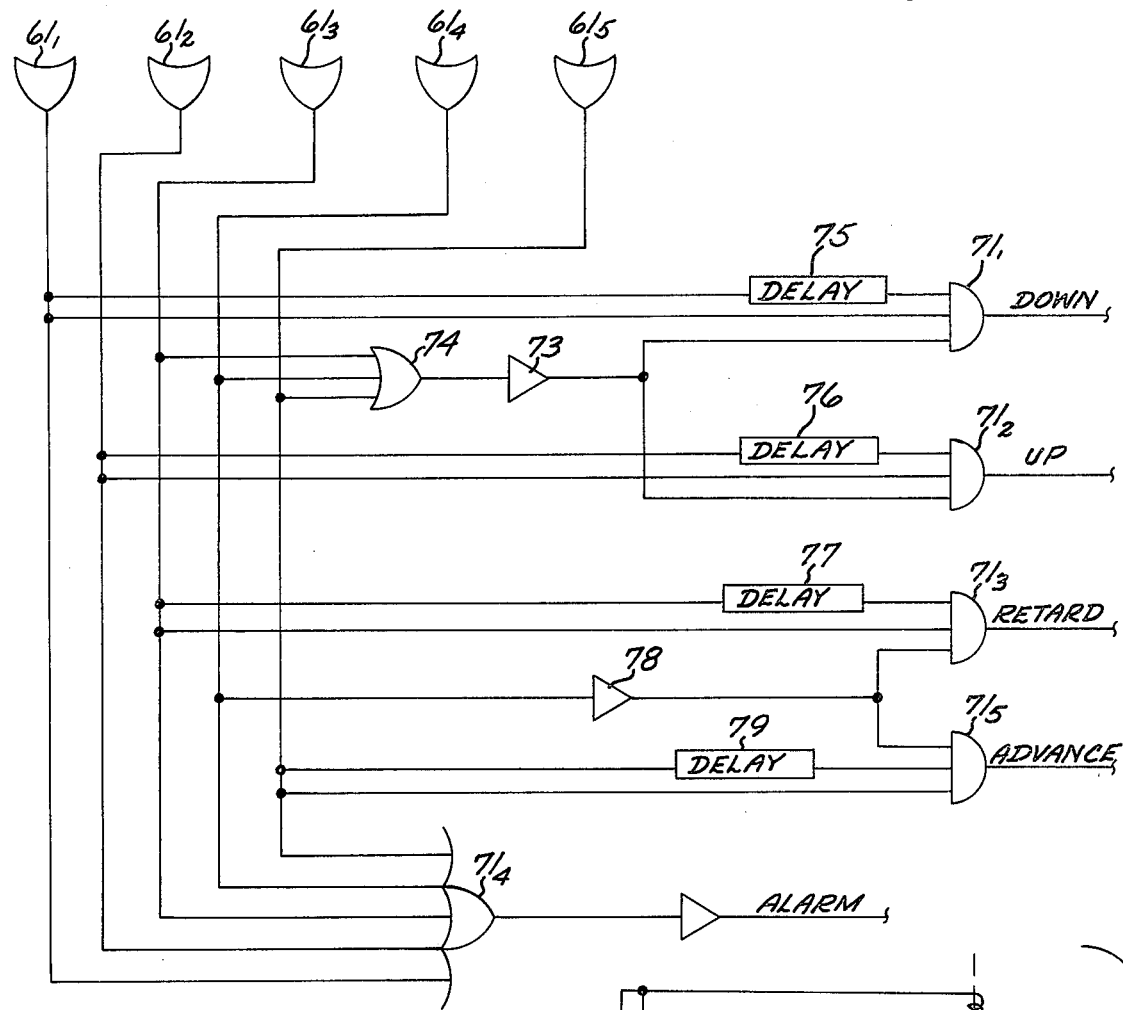
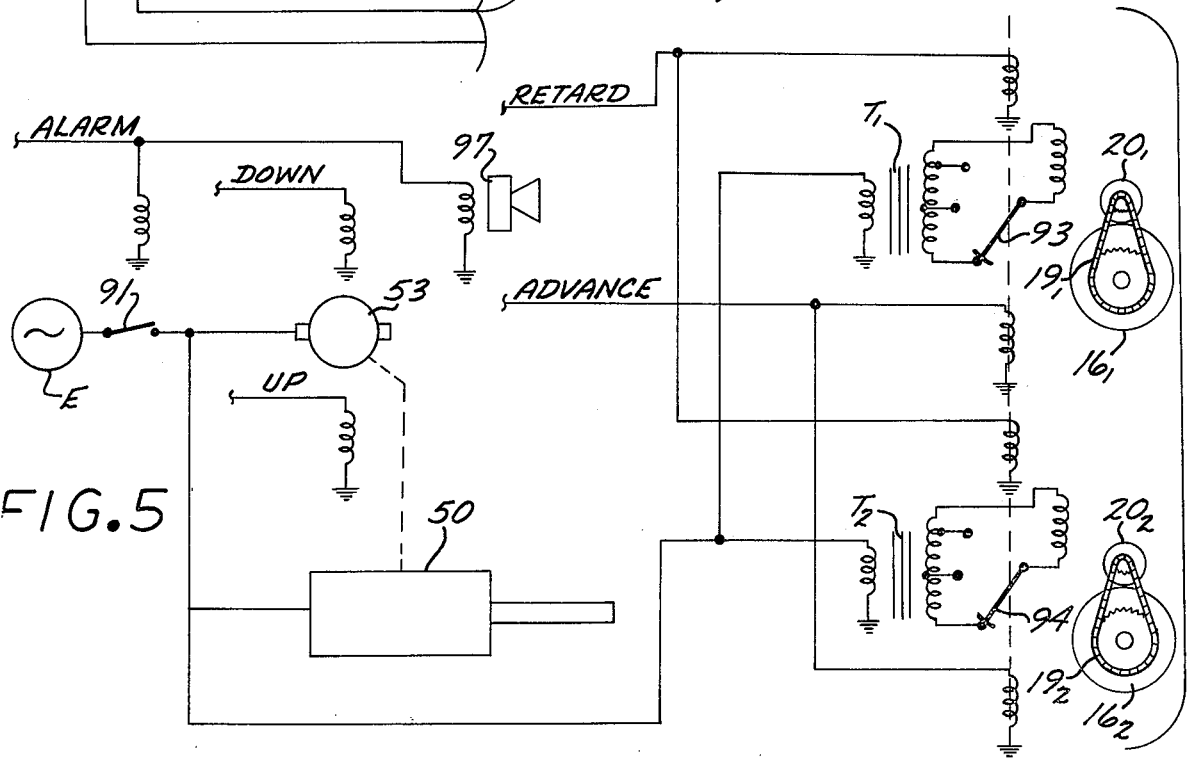

IRRIGATION PIPE CONTROL SYSTEM

BACKGROUND OF THE INVENTION

1. Field of the Invention

The present invention relates to irrigation systems, and more particularly to control systems therefor controlling the translation of moving irrigation pipes.

2. Description of the Prior Art

Agricultural irrigation, both because of statutory scheme and economic considerations, is best done in large tracts often in 160 acre increments. These large sizes dictate large irrigation arrangements which entail substantial lengths of irrigation pipe translated over the irrigated terrain to conserve equipment cost. In further contemplation of cost the irrigation pipe is designed for minimum weight and therefore includes thin walled segments supported at various points for translation.

Often the foregoing pipe structure is mounted for pivotal translation typically known as a center post irrigation system and may include sequenced end deployment, such as that described in our prior U.S. Pat. No. 4,033,508, to irrigate corners. Alternatively linearly translated pipe arrangements may be used in each instance the weight constraints on the pipe resulting in highly flexible and fragile structures which are translated over tilled ground. The foregoing translation is achieved by various powered dollies which also serve as the incremental pipe supports and it is the power variations and variations in the terrain that produce the major load deflections in the pipe.

Heretofore the pipe deflections of the foregoing type were corrected by various control systems responding to signals from mechanically coupled transducers such as strain gauges. Strain gauge use requires intimate contact with the pipe, thus subjecting the sensor to the temperature variations of the irrigation water. Similarly other mechanically coupled sensors respond to temperature effects, with the compounding effects of flexure modes being included in the sensor information. Furthermore most if not all prior art sensor arrangements entail the measurement of pipe deformation which because of cross coupling includes the loads due to vertical terrain undulation, a load input over which no control is possible or desired. For these reasons and others most of the prior art augmentation systems entailed elaborate control arrangements with the attendant cost and complexity in use. Furthermore load deflection sensing is typically pipe referenced and provides an inaccurate source of pipe position signals for possible program use.

SUMMARY OF THE INVENTION

Accordingly it is the general purpose and object of the present invention to provide a control system for correcting deflections in an irrigation pipe which is substantially independent of the loading deformation of the pipe at the point of signal reference.

Other objects of the invention are to provide an augmentation system for correcting deflections of irrigation pipe in the horizontal plane without combining the vertical flexures thereof.

Yet further objects of the invention are to provide an optically referenced irrigation pipe control system which is both adapted for sequencing use and to control pipe deflections.

Yet additional objects of the invention are to provide a laser referenced irrigation pipe control system which is substantially independent of the varying dynamics of motion of the pipe itself.

Yet other objects of the invention are to provide a control system for correcting deflections of an irrigation pipe which is simple to produce and reliable in use.

Briefly these and other objects are accomplished within the present invention by providing a laser mounted on a reference carrier supporting one end of a movable irrigation pipe which is directed to radiate a beam of collimated light to a photoelectric target on the other end of the pipe. The laser is mounted on the center pivot of a center post irrigation system (or on one end carrier in linearly translated systems), and is advanced along with the end of the pipe. At the other end the photoelectric target comprises three horizontally spaced target zones indicating a lead nominal and a lag condition respectively, of the pipe end. Included further in the photoelectric target are two vertically spaced target zones, one above the horizontal targets and the other below. The signals emitted by the horizontally spaced target zones are directed through a logic system to control the rate of advance of the proximate carrier while the vertical signals, once more by way of the logic system, pivot the laser in the vertical plane.

In each instance the logic system includes delays in the signal paths to filter out the higher frequency end motions. Furthermore the logic system includes an alarm and shutdown stage for turning off the laser and shutting down the carriage power if none of the target zones are illuminated by the laser beam. This last feature insures a failsafe shutdown mode and furthermore precludes injury to personnel who, by inadvertence, may find themselves in the laser beam.

BRIEF DESCRIPTION OF THE DRAWINGS

FIG. 3 is a plan view of a photoelectric target useful with the invention herein;

FIG. 4 is a logic diagram incorporating the control arrangement according to the present invention; and FIG. 5 is a diagram of the control input developed according to the invention herein.

DESCRIPTION OF THE SPECIFIC EMBODIMENT

While the following description sets out the inventive control system in conjunction with a center post irrigation system such is illustrative only. It is to be noted that other translated irrigation systems may be similarly controlled and no intent to limit the scope of the invention is expressed by the choice of illustrations herein.

Figure 1:
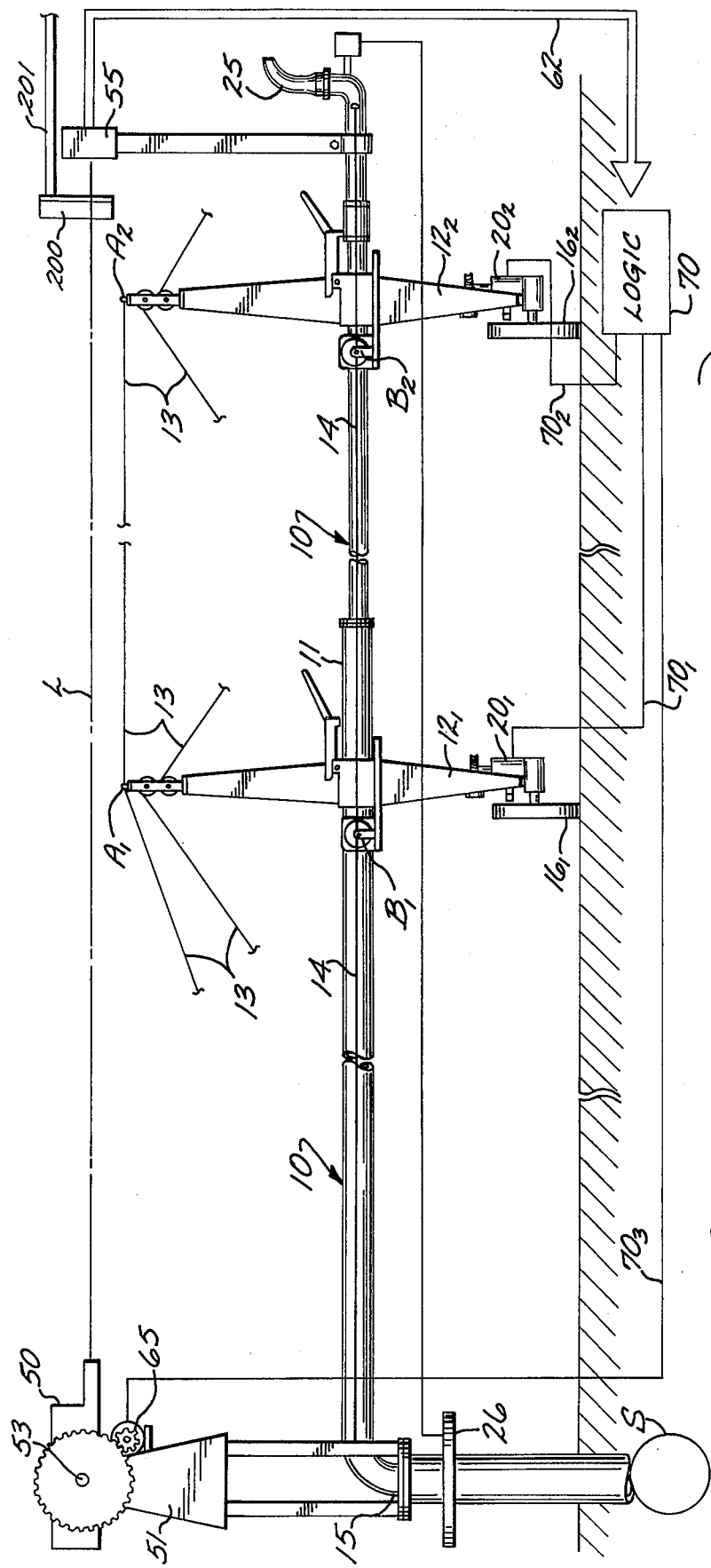
FIG. 1 is a diagrammatic illustration of a center post irrigation system including an inventive control system mounted thereon.

As shown in FIG. 1 a prior art center post irrigation system, generally designated by the numeral 10, comprises a length of thin walled pipe 11 supported by a plurality of wheeled carriages shown as $12_1$ and $12_2$ each terminating in an apex $A_1$ and $A_2$ above the pipe from which vertical wire stays 13 are deployed. In a similar manner each carriage includes fore and aft stay supports $B_1$ and $B_2$ from which lateral stays 14 are extended. This truss arrangement allows for the use of light pipe structure which extends for substantial dimensions, the typical tract thus irrigated being of 160 acre size.

Figure 2:
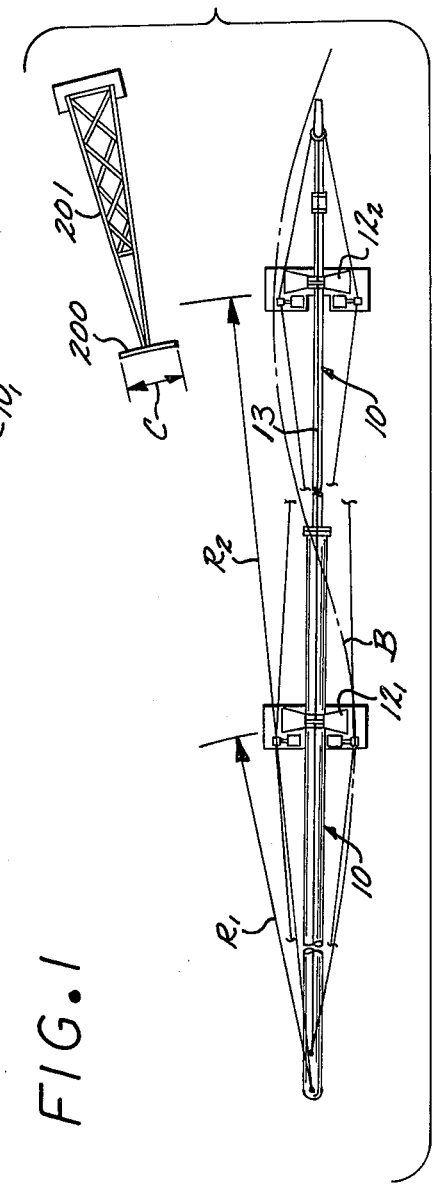
FIG. 2 is a top view of the irrigation system illustrating the flexure modes thereof.

Pipe 11, at one end, is connected through a pivotal seal 15 to a source of irrigation water S. The other end translates in a circle thereabout, each carriage $12_1$ and $12_2$ being supported by wheels $16_1$ and $16_2$ which in turn are driven by associated electric motors $20_1$ and $20_2$. As shown in FIG. 2 the rate of advance of each wheel $16_1$ and $16_2$ is geared to the ratio of radii shown as $R_1$ and $R_2$ from the pivot axis. Thus under ideal conditions the rate of each section of pipe 11 is in coherent relation with the other sections with little or no bending. In actuality, however, the terrain under each wheel is frequently uneven, the motor performance varies and various bending modes shown as the exemplary mode B are therefore set up. These bending modes combine with the cyclic thermal stresses in the pipe frequently leading to fracture.

Referring back to FIG. 1 pipe 11 at the free end may include a corner irrigation arrangement, shown symbolically as a telescoping end 25, an illustrative example being described in our prior U.S Pat. No. 4,033,508 for an Automated Irrigation System. End 25 is articulated by an arc position transducer 26 mounted at the pivot. Thus lateral deformations of the pipe may produce substantial errors in the corner irrigation sequence with the result that full irrigation can not be assured. Typically the fundamental and static bending modes produce the highest deformations the slow rate of advance of the pipe providing most energy input in these low frequency regions. Furthermore the arrangement of stays 13 and 14 effectively removes the higher bending modes from the input spectrum. Thus the large bending modes are most pronounced and require correction.

For the foregoing reasons the irrigation system 10 is provided with a laser 50 mounted on a pedestal 51 supported on the pivoting part of the pivoting seal 15. Laser 50 is aligned to direct a collimated laser beam L to a target 55 exending on a mount 56 attached to the free end of pipe 11. Thus the optical axis of beam L is laterally aligned along the ideal axis of pipe 11. In the vertical plane laser 50 is mounted for pivotal motion about a pivot 53 in pedestal 51, pivot 53 being geared through a pivot gear 54 to a servo motor 65. Thus the vertical alignment of beam L can be moved according to the location of target 55 and the illumination point thereon.

More specifically as shown in FIG. 3 target 55 is arranged as a rectangular target plate supported by a brace 56 on the free end of pipe 11. The target area itself is divided into five zones $60_1$, $60_2$, $60_3$, $60_4$ and $60_5$. Zones $60_1$ and $60_2$ are arranged as horizontal strips along the upper and lower edges of target 55 and thus register vertical misalignment of the laser 50. Disposed between zones $60_1$ and $60_2$ are three laterally spaced zones $60_3$, $60_4$ and $60_5$ indicating a horizontal lead, nominal and lag condition. Each of the target zones $60_1$ through $60_5$ each collecting the phototriggered signals of a corresponding zone. Thus five logic signals are developed depending on the beam position. These target output signals are shown by way of the signal path 62 in FIG. 1 which is applied to a logic stage 70. Logic stage 70 provides the necessary correction signals $70_1$ and $70_2$ to the driving motors $20_1$ and $20_2$ and a vertical position signal $70_3$ to the servo motor 65. Once more, signals $70_1$ through $70_3$ are multifunction signals and therefore refer to signal paths rather than wire connections.

As shown in FIG. 4 the signal from Gate $61_1$ is connected, both across a delay 71 and directly to the inputs of an AND gate $71_1$. Gate $71_1$ also receives the output of an inverter 73 which, in turn, is driven by an OR gate 74 collecting the signals from gates $61_3$, $61_4$ and $61_5$. Similarly the signal from gate $61_2$ is connected through a delay 76 and directly to an AND gate $71_2$ which also receives the output of inverter 73. Gate $71_1$ thus produces a signal DOWN, after the filtering of delay 71, to the servomotor 53 driving laser 50 and its beam L back down into the field of zones $60_3$ through $60_5$. Similarly gate $71_2$ by the signal UP drives the servomotor up. In each instance if gates $61_3$ through $61_5$ indicate beam overlap no correction is made.

The signal from gate $61_3$ is connected to yet another delay 77 with the output of the delay and the gate signal being collected at an AND gate $71_3$ which also receives gate $61_4$ output inverted through an inverter 78. Gate $71_3$ produces a retarding signal RETARD to motors $20_1$ and $20_2$ for slowing down the free end of pipe 11. Also gate $61_5$ both across a delay 79 and directly drives an AND gate $71_5$ which concurrently receives the output of inverter 78. Gate $71_5$ produces an advancing signal ADVANCE to motors $20_1$ and $20_2$. In this manner the centered signal from gate $61_4$ is received in both the advance and retard mode to once more suppress correction in beam overlap situations.

In order to provide for failsafe operations gates $61_1$ through $61_5$ are collected at an OR gate $71_4$ which, across an inverter 80, produces an alarm signal ALARM, which also shuts down the system.

As shown in FIG. 5a source of electrical excitation E is tied across a relay 91 to power the laser 50, servo motor 65, and the primaries of two transformers $T_1$ and $T_2$. The secondaries of transformers $T_1$ and $T_2$ are conformed as multitapped windings the taps being selected by two relay switches 93 and 94. Switches 93 and 94 are articulated from a nominal state by the RETARD and ADVANCE signals, the switch arm in each instance completing the circuit to motors $20_1$ and $20_2$. Thus a power change to each motor can be effected which corresponds to the fundamental beam bending function of pipe 11. Motors $20_1$ and $20_2$ are in turn geared by a gearing ratio set according to the radius arm relative the pipe pivot, each including a chain drive $19_1$ and $19_2$ to the wheels $16_1$ and $16_2$. The corrections therefore are coherent with the rate of translation, to bring out the fundamental bending mode. If the beam is totally off target the power E is shut down and an audio alarm 97 is excited.

This same automatic shut down feature may be used for controlled positioning or end of cycle provisions according to the further structure shown in FIGS. 1 and 2. More specifically a shading mask 200 may be suspended in cantelever on frame 201 to intercept beam L over a predetermined segment of arc C. Mask 200 may be fully passive thus providing a controlled shutdown or may be dimensioned in arc C to be less than the inertial response fundamental of the irrigation system, i.e., within the time constant of delays 71, 76, 77 or 79, and can therefore be active. When active mask 200 may be similarly photoresponsive to provide various counting features or other logical functions useful with the system herein.

The foregoing arrangement may be utilized together with selected stationary targets intercepting the laser beam at programming points or may be picked up by a coding disc described in our above referenced prior patent.

Some of the many advantages of the present invention should now be readily apparent. As set out the invention provides a control arrangement which can be adapted to various bending functions and therefore various truss configurations by the convenient selections of correction gain.

Obviously many modifications and variations to the above disclosure can be made without departing from the spirit of the invention. It is therefore intended that the scope of the invention be determined solely on the claims appended hereto.

What is claimed is:

1. A control system for correcting deflections of a movable irrigation pipe including powered dollies for support, said irrigation pipe including a pivoted end and a free end comprising:
   a source of electrical excitation;
   a laser operatively connected to said source for producing a laser beam;
   mounting means deployed on said pivoted end of said pipe and connected to support said laser thereon, said mounting means including a pivotal gear means aligned to provide pivotal motion of said laser in a vertical plane including the central axis of said pipe and a servo motor connected to pivot said gear means in response to vertical control signals;
   sensing means deployed on said free end of said pipe and aligned for exposure to said laser beam, said sensing means including a first horizontal photoresponsive strip along the upper edge thereof, a second photoresponsive strip aligned subjacent said first strip and a third photoresponsive strip along the lower edge of said sensing means, said second strip including a first, second and third laterally spaced sensing zones;
   advancing means included in said dollies for changing the rate of advance thereof in response to an advance control signal produced by impingment of said laser beam on a respective one of said laterally spaced sensing zones; and
   control means connected to produce said vertical control signal to said servo motor according to the impingment of said laser beam on said first and third strip and to produce a control signal indicative of the impingment of said laser beam on said first and third zones to maintain said laser beam on said second strip regardless of the relative vertical movement of said free end of said irrigation pipe.

2. Apparatus according to claim 1 wherein:
   said servo motor is rendered operative in a first direction upon the impingment of said beam on said first strip and in a second direction upon the impingment of said beam on said third strip, said servo motor being connected to said pivotal joint for directing said beam towards said second strip.

3. Apparatus according to claim 2 further comprising:
   alarm means operatively connected to said first, second and third strips rendered operative when said beam is outside said strips; and
   turn-off means interposed between said source and said laser rendered operative in parallel with said alarm means for interrupting the application of electrical excitation to said laser upon the operation thereof.

* * * * *